United States Patent Office 3,080,289
Patented Mar. 5, 1963

3,080,289
SUSTAINED ACTION ZINC-BOVINE CORTICOTROPIN-TANNIC ACID PREPARATION
Robert E. Thompson, Momence, Ill., assignor, by mesne assignments, to Armour Pharmaceutical Company, a corporation of Delaware
No Drawing. Filed Jan. 20, 1959, Ser. No. 787,812
3 Claims. (Cl. 167—74)

This invention relates to a sustained or prolonged action corticotropin preparation and to processes for preparing the same.

This application is in part a continuation of my co-pending patent application Serial No. 639,628, filed February 12, 1957, now abandoned, which in turn is a continuation-in-part of my patent application Serial No. 222,531, filed April 23, 1951, now abandoned.

In the preparation of sustained effect or prolonged action corticotropin products, efforts have been made to provide an insoluble corticotropin preparation which, when introduced subcutaneously or intramuscularly, would be effective in feeding corticotropin into the blood stream and thence into the adrenal glands. One difficulty with such preparations is that they are relatively short-lived unless intolerable doses are employed. A further difficulty is that they do not uniformly feed the corticotropin material to the blood stream. Further, such preparations have been lacking in reliable stability.

The usual aqueous solutions of corticotropin hormone substances alone have, after injection, a rather short duration of action, and the effect tends to rise for a period of time to a peak and then to decrease to a point below the level of value desired. For example, most of the commonly studied hematological and metabolic changes brought about by the corticotropin hormone reach a maximum by the fourth hour after administration and have completely regressed by the eighth hour. In order to maintain an over-all average level of the value desired, it is necessary to administer an amount of the hormone substance which will produce a maximum effect at the fourth hour, and at the time this maximum effect is produced, there is an excess of value above that desired. While the hormone substances may have an effect over an eight hour period, it is necessary to administer it in intervals of six hours or less in order to maintain the over-all level, and at the peak periods there is an excess of use of the activity and, therefore, a loss of the valuable substance. There is need for preparations which will reduce the effect during the so-called "peak periods" while maintaining a higher level of the effect throughout the entire period of treatment.

An object of the present invention is to provide a corticotropin preparation which may be introduced subcutaneously or intramuscularly for the feeding of the corticotropin to the blood stream over an extremely long period. A further object is to provide such a preparation in which the corticotropin remains active and is fed evenly or uniformly over an extended period. Yet another object is to provide such a preparation which may be adjusted for feeding the active substance into the blood stream for selected periods, which may be a moderate period or a greatly extended period. A still further object is to provide a method of preparation of a corticotropin in which the length of stimulation by the preparation is varied. A further object is to provide an adrenal gland-stimulating substance which remains stable under long storage conditions. Yet another object is to provide a corticotropin complex having an intense and prompt action when administered, while producing a relatively even stimulation of the adrenal glands over a long period of time while at the same time more nearly stimulating the natural feeding or secretion of the hormone by the pituitary. Other specific objects and advantages will appear as the specification proceeds.

In one aspect of this invention, there is provided a corticotropin preparation demonstrating prolonged action on subcutaneous or intramuscular administration which comprises an aqueous suspension including from 20 to 500 United States Pharmacopoeia (USP) subcutaneous units per ml. of corticotropin derived from bovine pituitary tissue, from 0.1 to 2.5 mg. of tannic acid per 100 USP subcutaneous units of corticotropin, and at least 0.1 mg. of zinc per 100 USP subcutaneous units of corticotropin. Moreover, at least a portion of this aqueous suspension consists of a zinc-corticotropin-tannic acid complex.

The terminology "USP subcutaneous units" refers to the subcutaneous corticotropin assay and unitage thereof set forth in the United States Pharmacopoeia XV.

This corticotropin preparation is suitable for administration to animals and human beings by any route, but it will be understood that since the basis for the prolonged action thereof is the formation in the tissues of a depot, it is preferred that the administration thereof be parenterally by other than the intravenous route. Especially desirable prolonged corticotropin action is to be obtained when this preparation is administered subcutaneously or intramuscularly.

It has been found that corticotropin derived from porcine pituitary tissue, when combined with a zinc salt and tannic acid, results in the formation of a zinc-corticotropin-tannic acid complex which is substantially inactive on subcutaneous or intramuscular administration. However, according to my co-pending patent application Serial No. 755,139, filed August 15, 1958, the provision with porcine ACTH of a zinc-corticotropin-gelatin-tannic acid complex obviates this problem. On the other hand, it has been found that the provision with bovine ACTH of a zinc-corticotropin-complex results in a product which demonstrates desirable prolonged and controlled action on subcutaneous or intramuscular injection. Thus, the corticotropin which may be employed in this corticotropin preparation includes both high and low potency substances, and the process set forth herein is applicable to substances extracted from bovine pituitary glands and to synthetic preparations of such active substances, both of which are referred to herein by the term "corticotropin." However, better results are to be obtained when the bovine corticotropin included in this preparation is of high purity having a potency of at least 20 USP subcutaneous units per milligram. Especially desirable results can be achieved with bovine corticotropin having a potency of at least 40 USP subcutaneous units per milligram.

As an example of the corticotropin, there may be included in this preparation a bovine corticotropin such as is described in U.S. Patent No. 2,739,099, Lottie J. Walaszek. Also, a desirable bovine corticotropin preparation can be obtained by the well-known oxycellulose purification procedure.

However, an especially desirable bovine corticotropin for utilization in the practice of this invention may be obtained by the procedures described in the co-pending patent application of C. W. Damaskus, Serial No. 549,501, filed November 28, 1955, now abandoned, and my co-pending application Serial No. 687,344, filed October 1, 1957, now U.S. Patent No. 2,992,165.

Although the bovine corticotropin may be included in this aqueous suspension at a concentration of from 20 to 500 U.S.P. subcutaneous units per cc., for practical purposes it is preferred to employ the corticotropin at a concentration of from 40 to 100 U.S.P. subcutaneous units per cc.

The tannic acid constituent of this corticotropin preparation may be derived from pharmaceutical grade tannic acid. Although the tannic acid may be included in this preparation at a concentration of from 0.1 to 2.5 mg. per 100 U.S.P. subcutaneous units of corticotropin, better results may be obtained at a concentration thereof from 0.2 to 1.0 mg. per 100 U.S.P. subcutaneous units of corticotropin, and especialy desirable results are obtained with tannic acid at a concentration of about 0.4 mg. per 100 U.S.P. subcutaneous units of corticotropin.

The zinc constituent of this corticotropin preparation may be derived from any zinc salt, but it is preferred of course to employ a water-soluble zinc salt such as zinc acetate. Although the zinc may be included in this aqueous suspension at a concentration of at least 0.1 mg. per 100 U.S.P. subcutaneous units of corticotropin, for practical purposes, it is preferred to employ the zinc at a concentration of from 0.5 to 2.0 mg. per 100 U.S.P. subcutaneous units of corticotropin.

It is possible to vary over a considerable range the duration of action obtained with this corticotropin preparation by adjusting the concentrations in the complex of the zinc and tannate components.

It is desirable for the corticotropin preparation of this invention to demonstrate a pH of from 4 to 8, and it is preferred that the aqueous suspension have a pH of about 5.

It is indicated hereinbefore that at least a portion of the three principal ingredients included in this aqueous suspension, namely zinc, corticotropin and tannic acid, should be in the form of a water-insoluble complex. By "aqueous suspension" is meant that this corticotropin preparation shall include a solid phase and a liquid (aqueous) phase wherein the solid phase is dispersable in the aqueous phase. Further, there is meant by the term "water-insoluble complex" that the solid phase includes at least a portion of the three principal ingredients in physical or chemical combination such that the complex is separable as an entity from the liquid phase. It will also be understood that a portion of any of the principal ingredients may be included in this corticotropin preparation as a constituent of the liquid phase, and in some instances it may be desirable to provide corticotropin in this composition in both soluble and insoluble form such that there is demonstrable both an immediate and a prolonged corticotropin effect.

It will be apparent that the formation of this corticotropin preparation, and especially the production of this water-insoluble complex, generally involves a mixing of the principal ingredients in an aqueous medium until the combination of at least a portion of such ingredients has been obtained. Consequently, it can be appreciated that the starting material will usually be an aqueous solution containing the desired concentration of corticotropin. However, it has been found that the sequence in which the remaining ingredients are combined with this aqueous corticotropin solution may be varied to alter the characteristics of the resulting product. On the one hand, if this aqueous corticotropin solution is first combined with tannic acid, the subsequent addition thereto of the zinc constituent can be achieved within a relatively wide pH range. On the other hand, when the aqueous corticotropin solution is first combined with the zinc salt, the subsequent addition thereto of tannic acid should be obtained at an alkaline pH of about 7.4.

Certain further ingredients may be included in this corticotropin preparation, especially for the purpose of enhancing the stability and shelf life thereof. For example, cysteine serves to stabilize all of the principal ingredients of this composition. Firstly, there is provided by cysteine an insolubilization of any soluble zinc in the preparation, thereby reducing local irritation which may be produced by the zinc ion. In addition, cysteine appears to retard chemical changes in the tannic acid and ACTH constituents of this composition. Also, the cysteine apparently combines with this water-insoluble complex to remain at the side of injection and may exert its anti-oxidative properties in the tissues. The cysteine may be included in this aqueous suspension at a concentration of from 0.2 to 2.0 mg. per 100 U.S.P. subcutaneous units of corticotropin. However, better results can be achieved at a cysteine concentration of about 1 mg. per 100 U.S.P. subcutaneous units of corticotropin.

Further, there may be combined wtih this corticotropin preparation, especially when there is intended a multiple injection product, such antibacterial agents as methyl and propyl paraminobenzoate. Satisfactory results have been achieved by employing the methyl paraminobenzoate at a concentration of about 0.1 to 0.2% (weight/volume), while the propyl paraminobenzoate may be included in this aqueous suspension at a concentration of about 0.01 to 0.02% (weight/volume). Phenol may also be used.

This invention can be further illustrated by the following specific examples.

EXAMPLE I

The following method was employed in enhancing the potency on subcutaneous administration of ACTH derived from bovine pituitary tissue.

Bovine ACTH purified by treatment with oxycellulose according to the procedure described in Bunding U.S. Patent No. 2,669,536, in the amount of 1 gm., was mixed with 100 ml. of distilled water. To the resulting solution was added 1 gm. of thiourea, and such solution was adjusted to pH 6.5 with a 20% sodium hydroxide solution.

This mixture was heated at a temperature of 100° C. for a period of 6 hours, and subsequently the mixture was cooled and filtered through a medium sintered glass filter. The separated precipitate thereby obtained was washed with water in such amount as to increase the volume of filtrate thereby obtained to 100 ml. The precipitate, which was relatively inactive with respect to ACTH activity, was discarded.

To 50 ml. of the foregoing filtrate was added 12 ml. of a 5% aqueous solution of zinc acetate containing 2 moles of water of hydration. The resulting solution was adjusted to pH 7.5 with a 3% sodium hydroxide solution. The precipitate thereby formed (zinc-ACTH) was separated from the supernatant liquid by filtration. The separated precipitate was suspended in 5 ml. of water, and the resulting mixture was adjusted to pH 5 with glacial acetic acid.

EXAMPLE II

The following method was employed for the preparation of an aqueous suspension of zinc-ACTH-tannic acid suitable for parenteral administration.

To 50 ml. of a zinc-ACTH mixture prepared according to the method of Example I was added 24 ml. of a 1% aqueous solution of tannic acid. The resulting mixture was adjusted to pH 6 with a 3% sodium hydroxide solution.

To this mixture was added 24 ml. of a 1% aqueous solution of cysteine, and such mixture was adjusted to pH 6. Thereafter, 2 ml. of glycerin and 0.6 gm. of phenol were added to the mixture, together with an amount of water sufficient to provide a total volume of 120 ml.

The resulting suspension was filled into two ml. vials, covered with nitrogen, sealed and autoclaved at a pressure of 15 p.s.i.g. for a period of 15 minutes to provide sterilization.

The finished preparation was analyzed for ACTH activity by the USP subcutaneous assay procedure. The results indicated that the vial preparation contained 76.1±5.8 USP units per ml.

Substantially all of the ACTH activity was contained in the insoluble complex as evidenced by an analytical result of less than 2 USP units of ACTH in the filtered supernatant fluid.

The formula of the foregoing ACTH preparation, on the basis of the amount of ingredient per ml. of suspension, was, as follows:

| Ingredient: | Concentration (per ml.) |
|---|---|
| ACTH | 76 USP units. |
| Zinc | 1.3 mg. (by assay). |
| Tannic acid | 2 mg. |
| Cysteine | 2 mg. |
| Glycerin | 1.6%. |
| Phenol | 0.5%. |

EXAMPLE III

The following method may also be employed in the preparation of an aqueous suspension of zinc-ACTH-tannic acid.

Bovine ACTH prepared according to the method of Example I, in the amount of 10 ml., was adjusted to pH 7.5. To this suspension was added 12 mg. of tannic acid in 0.5 ml. of water. Thereafter, 1 ml. of a solution containing 20% of glycerin and 6% of phenol was added to the mixture, together with 0.5 ml. of a 4.8% solution of cysteine. The formula of the finished preparation was, as follows:

| Ingredient: | Concentration (per ml.) |
|---|---|
| ACTH | 80 USP units. |
| Zinc | 2 mg. |
| Tannic acid | 1 mg. |
| Cysteine | 2 mg. |
| Glycerin | 1.6%. |
| Phenol | 0.5%. |

EXAMPLE IV

The following method was employed in the preparation of an aqueous suspension of zinc-ACTH-tannic acid.

Bovine ACTH prepared by treatment with oxycellulose according to the method of the aforementioned Bunding patent, in the amount of 0.5 gm., was mixed with 25 ml. of distilled water. To this solution was added 0.25% of pyridoxine hydrochloride, and such solution was adjusted to pH 4.7. This mixture was heated for a period of 4¼ hours at a temperature of 100° C. Thereafter, the mixture was cooled and diluted to a volume of 70 ml. with water. The diluted mixture was adjusted to pH 6.5 with an aqueous sodium hydroxide solution, and the precipitate thereby formed was separated from the supernatant liquid and discarded.

To the 70 ml. of filtrate thereby obtained was added 560 mg. of zinc acetate containing 2 moles of water of hydration. The resulting solution was adjusted to pH 7.5 with sodium hydroxide. This suspension was centrifuged, and the supernatant liquid thereby obtained was discarded. The separated precipitate was suspended in 70 ml. of water.

To the remaining 67 ml. of the foregoing suspension was added 11.2 ml. of a 0.5 solution of tannic acid, 14 ml. of a 2% cysteine aqueous solution, and 30 ml. of a solution containing 0.7 gm. of phenol and 2.5 ml. of glycerin. The resulting mixture was adjusted to pH 6 with a 3% aqueous sodium hydroxide solution.

This mixture was filled into two ml. vials. The filled vials were sealed and autoclaved for a period of 15 minutes at a pressure of 15 p.s.i.g. for sterilization.

The formula of this preparation was, as follows:

| Ingredient: | Concentration (per ml.) |
|---|---|
| Bovine ACTH | 97.5±9.2 USP units. |
| Zinc | 1.1 mg. (by assay). |
| Tannic acid | 0.5 mg. |
| Cysteine | 2.3 mg. |
| Glycerin | 2%. |
| Phenol | 0.5%. |

Clinical evaluation in human beings demonstrated that this preparation provided a duration of activity of about 48 hours and excellent efficiency as measured by urinary steroid excretion.

EXAMPLE V

The following represents a comparison of the zinc-ACTH-tannic acid preparations described in Examples II, III and IV.

Sixty hypophysectomized rats were randomly divided into three groups of 20 rats each. Each group of rats was subjected to the subcutaneous administration of 0.1 ml. of the test preparations. At suitable intervals, up to 96 hours after injection, groups of four rats each were sacrificed. Adrenal ascorbic acid, thymus weight and adrenal weight were measured in the sacrificed rats.

The results are set forth in the following table in which the preparations are identified according to the example which describes the method of the preparation thereof.

MEAN ADRENAL ASCORBIC ACID—MCG./MGM.

| Preparation | 7 hr. | 24 hr. | 48 hr. | 72 hr. | 96 hr. |
|---|---|---|---|---|---|
| I | 4.03 | 2.59 | 2.20 | 2.93 | 2.04 |
| II | 1.86 | 1.87 | 1.46 | 2.51 | 2.19 |
| III | 1.44 | 1.32 | 1.24 | 1.86 | 2.04 |

MEAN THYMUS WEIGHT—MGM.

| | 7 hr. | 24 hr. | 48 hr. | 72 hr. | 96 hr. |
|---|---|---|---|---|---|
| I | 341 | 285 | 149 | 105 | 40 |
| II | 294 | 283 | 90 | 62 | 39 |
| III | 300 | 174 | 80 | 38 | 34 |

MEAN ADRENAL WEIGHT—MGM.

| | 7 hr. | 24 hr. | 48 hr. | 72 hr. | 96 hr. |
|---|---|---|---|---|---|
| I | 24.7 | 27.8 | 37.9 | 33.1 | 42.4 |
| II | 27.2 | 32.9 | 39.9 | 37.1 | 45.4 |
| II | 27.1 | 36.5 | 47.4 | 42.3 | 48.1 |

While in the foregoing specification various embodiments of this invention have been described in considerable detail for the purpose of illustration, it will be apparent to those skilled in the art that this invention is susceptible to other embodiments and that many of these details can be varied widely without departing from the basic concept and spirit of the invention.

I claim:
1. A prolonged action corticotropin preparation, comprising an aqueous suspension of a water-insoluble complex of zinc, bovine corticotropin and tannic acid, said bovine corticotropin being contained in said aqueous suspension in a concentration of from 20 to 500 USP subcutaneous units per milliliter, said tannic acid being contained in said water-insoluble complex in a concentration of from 0.1 to 2.5 milligrams per 100 USP subcutaneous units of bovine corticotropin, and said zinc being contained in said water-insoluble complex at a concentration of at least 0.1 milligram per 100 USP subcutaneous units of bovine corticotropin.

2. A prolonged action corticotropin preparation, comprising an aqueous suspension of a water-insoluble complex of zinc, bovine corticotropin and tannic acid, said bovine corticotropin being contained in said aqueous suspension in a concentration of from 20 to 500 USP subcutaneous units per milliliter, said tannic acid being contained in said water-insoluble complex in a concentration of from 0.1 to 2.5 milligrams per 100 USP subcutaneous units of bovine corticotropin, and said zinc being contained in said water-insoluble complex in a concentration of from 0.5 to 2.0 milligrams per 100 USP subcutaneous units of corticotropin.

3. A prolonged action corticotropin preparation comprising an aqueous suspension of water-insoluble complex of zinc, bovine corticotropin and tannic acid, said bovine corticotropin being contained in said aqueous suspension in a concentration of from 20 to 500 subcutaneous units per milliliter, said tannic acid being contained in said water-insoluble complex at a concentration of from 0.1 to 2.5 milligrams per 100 USP subcutaneous units of bovine corticotropin, said zinc being contained in said water-insoluble complex at a concentration of from 0.5 to 2.0 milligrams per 100 USP subcutaneous units of bovine corticotropin, and said aqueous suspension containing from 0.2 to 2.0 milligrams of cysteine per 100 USP subcutaneous units of bovine corticotropin.

References Cited in the file of this patent

UNITED STATES PATENTS 2,807,569    Homan _____ Sept. 24, 1957

FOREIGN PATENTS 759,263    Great Britain _____ Oct. 17, 1956

OTHER REFERENCES

Mote: Procs., 2nd Clin. ACTH Conf. Therapeutics, 1951, page 28.